United States Patent [19]
Graul

[11] 3,959,761
[45] May 25, 1976

[54] SINGLE CONDUCTOR CURRENT TRANSFORMER ADAPTED TO BE INSTALLED INTO A FULLY INSULATED, METAL-ENCAPSULATED HIGH-VOLTAGE SWITCHING INSTALLATION

[75] Inventor: Otto Graul, Bamberg, Germany
[73] Assignee: Messwandler-Bau GmbH, Germany
[22] Filed: Apr. 7, 1975
[21] Appl. No.: 565,376

[30] Foreign Application Priority Data
Apr. 8, 1974 Germany............................ 2417023

[52] U.S. Cl.................................... 336/84; 336/96; 336/174
[51] Int. Cl.²......................................... H01F 40/06
[58] Field of Search ................. 336/84, 90, 96, 173, 336/174, 175; 317/103

[56] References Cited
FOREIGN PATENTS OR APPLICATIONS
1,538,244   4/1969   Germany ...…........................ 336/174

*Primary Examiner*—Thomas J. Kozma
*Attorney, Agent, or Firm*—Craig & Antonelli

[57] ABSTRACT

A single-conductor current transformer adapted to be installed into a fully insulated, metal-encapsulated high-voltage switching installation, whose cores and secondary windings are protected on all sides by a casing of electrically insulating material designed to provide an insulation for low voltage; the high voltage insulation is constituted by the insulating gas on the inside of the encapsulation of the high-voltage switching installation whereby the insulating casing forms the pressure housing for the insulating gas itself and is adapted to be secured with its end faces at the connecting flanges of the metal encapsulation of the high-voltage switching installation; metallic pipes are cast into the insulating casing within the outer edge area of the insulating casing for the return-conduction of the current, into which are adapted to be inserted connecting bolts for purposes of connection with the connecting flanges of the metal encapsulation.

26 Claims, 3 Drawing Figures

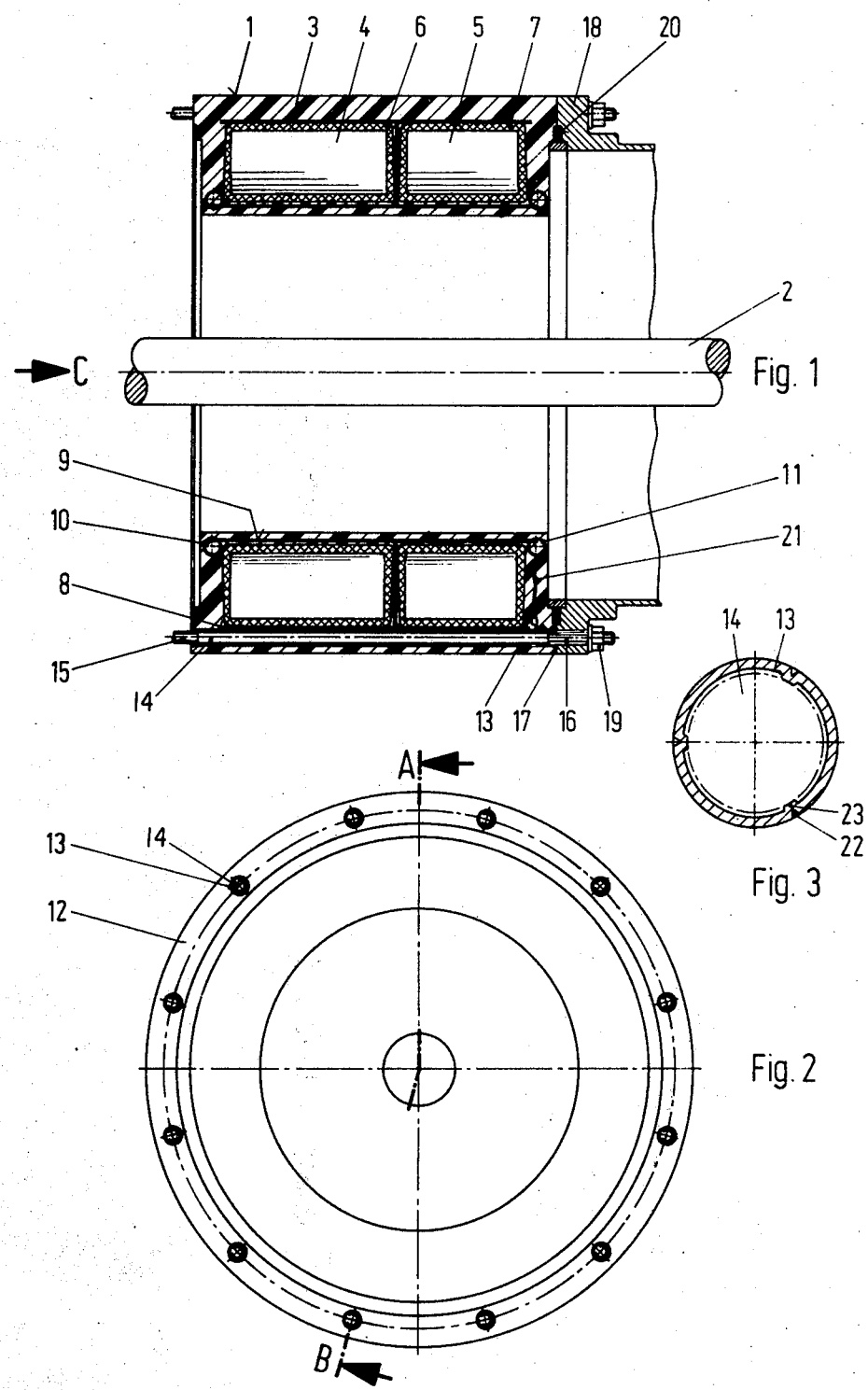

SINGLE CONDUCTOR CURRENT TRANSFORMER ADAPTED TO BE INSTALLED INTO A FULLY INSULATED, METAL-ENCAPSULATED HIGH-VOLTAGE SWITCHING INSTALLATION

The present invention relates to a single-conductor current transformer adapted to be installed into a fully insulated, metal-encapsulated high-voltage switching installation, whose cores and secondary windings are protected on all sides by a casing of electrically insulating material, which includes within the area of its inner circumferential surface a conductive or semi-conducting lining or cover and whose insulation is selected for low voltage, whereas the high-voltage insulation is formed by the insulating gas on the inside of the encapsulation of the high-voltage switching installation.

Such single-conductor current transformers which are inserted into a metal capsule or casing at ground or low voltage potential and secured on the inside of the metal capsules by means of a support member or by means of flange-like fastening members, are known as such in the prior art (Swiss Patent 453,490 and German Auslegeschrift 1,807,966).

It is additionally known from the Swiss Patent 453,490 and the German Gebrauchsmuster 7,017,125 to utilize ring-core or toroidal-core current transformers as single conductor transformers which are placed over the cylindrical pipe of the metal encapsulation and are secured externally at the pipe.

Whereas the installation of the single-conductor current transformer into the metal encapsulation entails the disadvantage of additionally required support and fastening parts, especially of gas-tight lead-out means for the secondary output lines through the metal encapsulation as well as an increased assembly expenditure, the emplacement and installation of the current transformer over the encapsulation is of disadvantage insofar as the transformer is not protected against external influences like the other electrical apparatus inserted into the encapsulation. Above all, for the purpose of preventing currents falsifying the measurements, care must be taken in the encapsulation that the encapsulating part is insulated within the area of the current transformer with respect to the adjacent encapsulating parts of the switching installation.

The present invention is now concerned with the task to provide a single-conductor current transformer of the aforementioned type adapted to be installed into a fully insulated, metal-encapsulated high-voltage switching installation, which is characterized in that the assembly expenditure is small and in that simultaneously the problem of the lead-out of the secondary output lines of the current transformer through the encapsulation or the separation of the encapsulation and insulation of the separated encapsulation parts do not occur.

The underlying problems are solved according to the present invention in that the insulating casing forms itself the pressure housing for the insulating gas and is adapted to be secured with its end faces at connecting flanges of the metal encapsulation and that for purposes of return conduction of the current, metallic pipes extending through the insulating casing and bridging the insulating casing are cast-in into the outer edge area of the insulating casing, into which fastening bolts are adapted to be inserted and are adapted to be connected with the connecting flanges of the metal encapsulation.

The single-conductor current transformer according to the present invention provided for the installation into a fully insulated, metal-encapsulated switching installation therefore makes it possible that one is able to dispense completely with the encapsulating pipe within the area of the current transformer without interrupting the return line of the current in the metal encapsulation of the switching installation. The insulating casing manufactured preferably of a solid casting of conventional synthetic resinous material, is able to withstand without difficulty the comparatively low operating and testing pressure values required with the preferable utilization of sulfahexafluoride as insulating medium. With other types of insulating gases, which require higher operating and testing pressure values, the insulating casing according to a further feature of the present invention may be reinforced sufficiently by metal or non-metallic reinforcing inserts such as rings, meshworks, fabric webs, especially of glass fibers, or the like, preferably cast into the plastic casing. The extraordinarily low installation and assembly expenditure for the single-conductor current transformer according to the present invention is of particular advantage. Thus, not only additional support or fastening elements for a fastening of the transformer inside of the encapsulation pipe can be dispensed with, but also the tedious and costly assembly and installation operations on the inside of the spatially constricted encapsulation of the switching installation are eliminated. As a result of the incorporation of the single-conductor current transformer according to the present invention into the encapsulation system of the switching installation, the current transformer forms a structural block integrated with the switching installation, which can be fitted organically into the overall installation, in contrast to the prior art single-conductor current transformers placed over the encapsulation pipe whose exposed arrangement is atypical for the overall switching installation.

Accordingly, it is an object of the present invention to provide a single conductor current transformer adapted to be installed into a fully insulated, metal-encapsulated high-voltage switching installation which avoids by simple means the aforementioned shortcomings and drawbacks encountered in the prior art.

Another object of the present invention resides in a single-conductor current transformer adapted to be installed into a fully insulated, metal-encapsulated high-voltage switching installation which eliminates the need for additional support and fastening means, particularly of gas-tight lead-outs for the output lines of the secondary windings.

A further object of the present invention resides in a single-conductor current transformer of the type described above which not only reduces the expenditures in assembling the same but insures a satisfactory protection of the current transformer and its parts against external influences without resort to an encapsulation pipe.

Still a further object of the present invention resides in a single-conductor current transformer adapted to be installed into a fully insulated, metal-encapsulated high-voltage switching installation which provides a completely satisfactory insulation of the section within the area of the current transformer with respect to the adjacent encapsulation sections of the switching installation.

Another object of the present invention resides in a current transformer of the type described above which permits a complete elimination of a metal encapsulation within the area of the current transformer without interrupting the current return in the metal encapsulation.

A still further object of the present invention resides in a current transformer of the type described above which can be incorporated into the overall switching installation as an integrated part thereof to be assembled in the manner of a building-block system.

These and other objects, features and advantages of the present invention will become more apparent from the following description when taken in connection with the accompanying drawing which shows, for purposes of illustration only, one embodiment in accordance with the present invention, and wherein:

FIG. 1 is a longitudinal, cross-sectional view through a single-conductor current transformer according to the present invention, taken along line A-B of FIG. 2, and illustrating a preferred embodiment of the coupling places with the metal encapsulation of the fully insulated, high-voltage switching installation;

FIG. 2 is an end elevational view on the single-conductor current transformer according to FIG. 1, taken in the direction of arrow C of FIG. 1; and FIG. 3 is a cross-sectional view, on an enlarged scale, through a metallic pipe cast into the insulating casing of the single-conductor current transformer, which is provided with notches to establish an electrical connection.

Referring now to the drawing wherein like reference numerals are used throughout the various views to designate like parts, the single-conductor current transformer according to the present invention, which is provided for the installation into a fully insulated, metal-encapsulated high-voltage switching installation, is designated in FIG. 1 by reference numeral 1. It includes an insulating casing 3 concentrically surrounding the primary conductor 2. The insulating casing 3 surrounds on all sides the iron cores 4 and 5 with the associated secondary windings 6 and 7. The insulating casing 3 forms itself the pressure housing for the insulating gas, preferably sulfahexafluoride, of the fully insulated, metal-encapsulated high-voltage switching installation of otherwise conventional type. The secondary system 4 – 7 is protected by a padding or cushion 8 against non-permissive pressure loads and stresses during the manufacture of the insulating casing 3, preferably of synthetic resinous casting material. An electrode 9 of conducting or semi-conducting material which serves as field-control electrode, i.e., for the dielectric relief of the secondary system, is cast into the insulating casing 3. The electrode 9 is preferably made of gauze wire or the like. For purposes of avoiding corona appearances at higher load, this electrode may be provided at its end faces with ring-shaped wire coils or spirals 10 and 11.

Metallic pipes 13 uniformly distributed over the circumference of the insulating casing 3 (FIG. 2) are cast-in within the outer edge area 12 of the insulating casing 3 on the outside of the secondary system 4 – 7. Fastening bolts 14 with threads 15 and 16 at the ends thereof are inserted into the metallic pipes 13 and are connected with the connecting flanges 17 of the metal encapsulation 18—in FIG. 1 only the right connecting flange is shown, however, the left connecting flange is correspondingly constructed. During the tightening of the nuts 19, the connecting flanges 17 are brought into contact with the metallic pipes 13, possibly with the mounting of contact disks enlarging the abutment surfaces. The cross section of the fastening bolts 14 consisting of electrically conducting material such as aluminum, brass or the like or of the metallic pipes 13 is so dimensioned that the return conduction of the current by way of the metal encapsulation 18 is assured. The ring-shaped sealing elements 20 provided at the coupling places are sufficiently elastic in order not to impair the contact between the metallic pipes 13 and the connecting flanges 17.

The connection of the electrode 9 with the low voltage potential of the metal encapsulation 18 takes place by way of electrical potential connections 21, electrically connected with the metallic pipes 13, for example, by riveting, soldering or the like. The electrical connections between the metallic pipes 13 and the fastening bolts 14 preferably inserted into the pipes 13 with slight clearance, are established by electrical connecting notches in the metallic pipes 13, whence corresponding contact lugs or projections 23 result (FIG. 3).

The fastening arrangement of the single-conductor current transformer according to the present invention by means of metallic pipes and fastening bolts 14 extending therethrough offers the advantage that the necessary frictional connection between the connecting flanges 17 of the metal encapsulation 18 and the single conductor current transformer 1 takes place by way of these metal parts, and not by way of the synthetic resin casting material. Additionally, the fastening bolts 14 or with a corresponding dimension also the cast-in pipes 13 may be used simultaneously as current return conductors. Furthermore, two or more of these single-conductor current transformers may be assembled building-block-like adjacent one another and may be connected in common with the connecting flanges 17 of the metal encapsulation 18 by means of the fastening bolts 14.

The current return conduction by way of the fastening bolts 14 completely extending through the insulating casing 3 or by way of the pipes 13, however, is not a necessary feature of the present invention. One or several additional apertures for the accommodation of conductor elements (current return conductors) which are adapted to be connected with the connecting flanges 17 of the metal encapsulation 18, may also be provided between the pipes 13 receiving the fastening bolts 14 within the edge area 12 of the insulating casing 3.

In the illustrated embodiment the single-conductor current transformer 1 includes two cores, for example, a protection and measurement core. Of course, the number of cores can be chosen far-reachingly at will.

As mentioned hereinabove, the insulating casing or jecket 3 can be formed by a solid casting of synthetic resinous casting material. Not only the cores and the associated secondary windings but simultaneously also metallic or non-metallic reinforcing inserts, such as reinforcing rings, meshworks, fabric webs—preferably of fiberglass—may be embedded in the synthetic resinous material constituting the casing.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A single-conductor current transformer adapted to be installed into a fully insulated, metal-encapsulated high-voltage switching installation having a metal encapsulation provided with connecting flange means, comprising core and secondary winding means, casing means of electrically insulating material protecting substantially on all sides the core and secondary winding means, the casing means being provided within the area of its inner circumferential surface with an at least semi-conducting lining means and being effective to provide a low-voltage insulation, with the high-voltage insulation of the current transformer to be constituted by insulating gas on the inside of the encapsulation of the high-voltage switching installation, characterized in that the insulating casing means forms itself a pressure housing for the insulating gas on the inside of the high-voltage switching installation, the insulating casing means being operable to be secured with its end faces at the connecting flange means, pipe means extending through the insulating casing means in the outer edge area thereof and fastening bolt means in said pipe means adapted to be connected with the connecting flange means of the metal encapsulation.

2. A single-conductor current transformer according to claim 1, characterized in that the pipe means are cast into the insulating casing means.

3. A single-conductor current transformer according to claim 1, characterized in that said lining means is of conductive material.

4. A single-conductor current transformer according to claim 1, characterized in that the pipe means are metallic pipe means and are substantially uniformly distributed over the circumference of the insulating casing means within the outer edge area thereof.

5. A single-conductor current transformer according to claim 4, characterized in that at least one of the two parts consisting of fastening bolts and pipe means form return conductors for the current, which bridge the insulating casing means.

6. A single-conductor current transformer according to claim 5, characterized in that electrical connections are provided between the lining means, the metallic pipe means and the fastening bolt means.

7. A single-conductor current transformer according to claim 6, characterized in that the electrical connections between the metallic pipe means and the fastening bolt means are established by electrical connecting notches provided in the pipe means.

8. A single-conductor current transformer according to claim 7, characterized in that the lining means arranged in the area of the inner circumference of the insulating casing means is constructed as an electrode cast into the insulating casing means.

9. A single-conductor current transformer according to claim 8, characterized in that the electrode is made of gauze wire.

10. A single-conductor current transformer according to claim 8, characterized in that ring-shaped wire turns are provided at the end faces of the electrode.

11. A single-conductor current transformer according to claim 8, characterized in that at least two such current transformers are assembled building-block-like and are connected in common by means of the fastening bolt means.

12. A single-conductor current transformer according to claim 8, characterized in that the insulating casing means is reinforced by reinforcing inserts.

13. A single-conductor current transformer according to claim 12, characterized in that the reinforcing inserts are cast into the insulating casing means.

14. A single-conductor current transformer according to claim 12, characterized in that the reinforcing inserts are metallic.

15. A single-conductor current transformer according to claim 12, characterized in that the reinforcing inserts are non-metallic.

16. A single-conductor current transformer according to claim 12, characterized in that the reinforcing inserts are in the form of rings.

17. A single-conductor current transformer according to claim 12, characterized in that the reinforcing inserts are in the form of fabric webs.

18. A single-conductor current transformer according to claim 12, characterized in that the reinforcing inserts are in the form of meshworks.

19. A single-conductor current transformer according to claim 1, characterized in that at least one of the two parts consisting of fastening bolts and pipe means form return conductors for the current, which bridge the insulating casing means.

20. A single-conductor current transformer according to claim 1, characterized in that electrical connections are provided between the lining means, the metallic pipe means and the fastening bolt means.

21. A single-conductor current transformer according to claim 1, characterized in that electrical connections between the metallic pipe means and the fastening bolt means are established by electrical connecting notches provided in the pipe means.

22. A single-conductor current transformer according to claim 1, characterized in that the lining means arranged in the area of the inner circumference of the insulating casing means is constructed as an electrode cast into the insulating casing means.

23. A single-conductor current transformer according to claim 22, characterized in that ring-shaped wire turns are provided at the end faces of the electrode.

24. A single-conductor current transformer according to claim 1, characterized in that at least two such current transformers are assembled building-block-like and are connected in common by means of the fastening bolt means.

25. A single-conductor current transformer according to claim 1, characterized in that the insulating casing means is reinforced by reinforcing inserts.

26. A single-conductor current transformer according to claim 25, characterized in that the reinforcing inserts are cast into the insulating casing means.

* * * * *